Feb. 23, 1954     L. H. LEONARD     2,670,216
FOLDABLE BABY STROLLER

Filed April 1, 1948

INVENTOR
LLOYD H. LEONARD,
BY Stone, Boyden & Mack,
ATTORNEYS

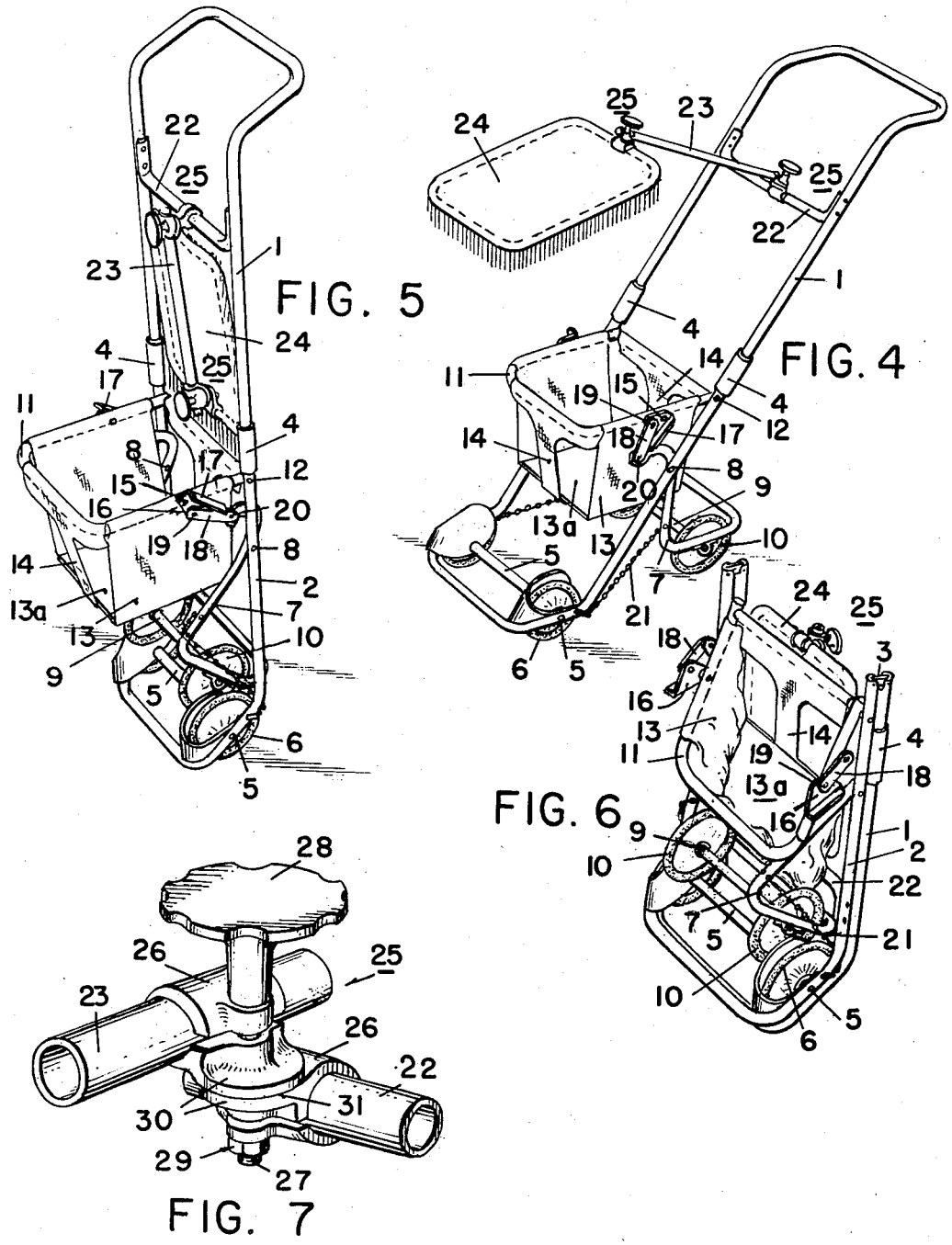

Feb. 23, 1954

L. H. LEONARD 2,670,216

FOLDABLE BABY STROLLER

Filed April 1, 1948

INVENTOR:
LLOYD H. LEONARD,
BY Stone, Boyden & Mack,
ATTORNEYS

Patented Feb. 23, 1954

2,670,216

UNITED STATES PATENT OFFICE 2,670,216

FOLDABLE BABY STROLLER

Lloyd H. Leonard, New Hyde Park, N. Y.

Application April 1, 1948, Serial No. 18,431

8 Claims. (Cl. 280—41)

1

This invention relates to baby carriages and the like, and more particularly to hand propelled, low built vehicles of the type commonly known as "strollers." Vehicles of this nature are usually provided with a seat in which the child rides in a sitting position, with feet extending downwardly.

Such vehicles often comprise front and rear pairs of wheels carried by main and auxiliary frames which are pivotally connected and capable of being folded together or collapsed for storage or transportation. So far as is known, however, in all such arrangements heretofore proposed, the seat is collapsed when the frames and wheels are folded. Thus the frames and wheels cannot be folded while the seat is occupied.

The main object of the present invention is to provide a stroller of the above nature so constructed that the auxiliary frame, carrying the rear wheels, may be folded or collapsed without in any way affecting the operative position of the seat. In other words the object of the invention is to provide a stroller which is readily convertible during operation, from four wheels to two wheels, while maintaining the seat in operative position.

In this way the amount of floor space ordinarily occupied by the polygonal wheel base may be reduced at will by folding up the auxiliary frame carrying the rear wheels, without disturbing the child occupying the seat, so that when thus folded, the entire stroller requires substantially no more floor space than that ordinarily occupied by a standing adult.

This is particularly advantageous when it is desired to take the stroller, carrying the baby, into crowded areas such as elevators, public vehicles, and even crowded stores.

Another and subsidiary object of the invention is to devise a construction in which the weight of the child in the seat serves to hold the auxiliary frame in collapsed or folded position.

A still further object of the invention is to achieve the above mentioned conversion during operation, while preserving the usual and desirable feature of complete folding into a compact form for purposes of storage or transportation.

And still another feature of the invention is the provision, in connection with a folding vehicle of the type referred to, of a sunshade or canopy so constructed that it may be adjusted to any desired position and, when not in use may be folded substantially into the plane of the main frame so that it lies within the general outline

2 of the vehicle when completely folded or collapsed for storage.

With the above and other objects in view, and to improve generally on the details of such vehicles, the invention consists in the construction and arrangement of parts hereinafter described and claimed and illustrated in the accompanying drawings forming part of this specification, and in which:

Fig. 4 is a perspective view of the vehicle as it is shown in Fig. 1;

Fig. 5 is a perspective view of the vehicle as it is shown in Fig. 2, but with the canopy in a different position;

Fig. 6 is a perspective view of the vehicle in folded or collapsed form as shown in Fig. 3;

Fig. 7 is a fragmentary perspective view on an enlarged scale showing the special clamping device used for holding the canopy;

Figure 1:
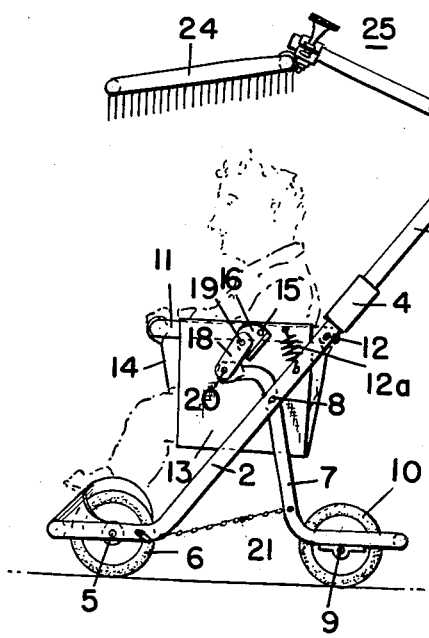
Fig. 1 is a side elevation of one form of my improved vehicle showing it as supported on both rear and front wheels for normal use, and showing the sunshade or canopy in one position.

Referring to the drawings in detail and more particularly first to Figs. 1 to 7 thereof my improved vehicle comprises main and auxiliary frames. The main frame is shown as formed of two U-shaped parts 1 and 2 pivotally connected at their middle as by means of links 3, and normally held rigidly in alignment by means of sleeves 4 fitting over said links. Any other preferred manner of connecting the two sections of the main frame may of course be employed. The cross bar at the upper end of section 1 is disposed so as to extend substantially horizontally and constitute a handle, while the lower end of the other section also preferably extends horizontally and carries an axle 5 on which the front wheels 6 are mounted.

An auxiliary U-shaped frame 7 has its legs pivotally connected to the side members of the main frame at 8. The lower end of this auxiliary frame, which also preferably extends horizontally, carries an axle 9 on which the rear wheels 10 are mounted.

A rectangular seat frame 11 is pivoted at one end at 12 between the side members of the main frame and extends forwardly therefrom. A seat 13a is suspended from this frame by side members 13 and front and rear members 14, of canvas. As best shown in Figs. 4, 5 and 6, these members 14 are relatively narrow, providing on each side openings for the child's legs. Thus the child may be placed in the seat facing either forwardly, as shown in Figs. 1 and 2, or rearwardly, as desired.

Figure 2:
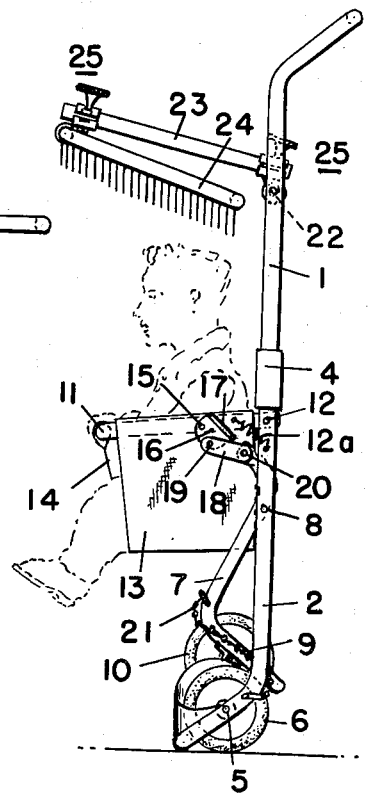
Fig. 2 is a similar view but showing the vehicle as it appears when converted from four wheels to two wheels, and also showing the canopy in another position.

As clearly shown in Fig. 1 the auxiliary frame 7 crosses the main frame and its upper end normally projects forwardly therefrom as shown in Figs. 1 and 4. This forwardly projecting end of the auxiliary frame is connected to the seat frame on each side by link means. This link means comprises a link 16 pivoted to the frame 11 at 15, and another link 18 pivotally connected at one end to the link 16, as indicated at 19, and pivotally connected at its other end to the auxiliary frame as shown at 20. The members 16 and 18 constitute toggle links, and these are constructed with a so-called "rule" joint, that is to say a joint that limits the pivotal movement in one direction. As shown in the drawings this may be accomplished by providing the link 16 at one edge with an upstanding flange 17 which engages the link 18 and thus limits its pivotal movement.

From an inspection of Fig. 1 it will thus be seen that the link means above described serves to support the seat frame 11 in substantially horizontal position, the two links, with their rule joint, constituting in effect a single rigid link connecting the auxiliary frame with the seat frame. In order to yieldingly maintain the seat frame in the position shown it is preferably connected to the main frame by means of light springs 12a.

It will be noted that in the normal four wheel position the main frame is disposed diagonally at an angle of approximately 45°, and the seat frame 11 is disposed at an acute angle to this frame. A chain 21 or the like connects the main and auxiliary frames adjacent to the wheels so as to limit the spacing of the rear wheels from the front wheels.

When it is desired to convert the vehicle from four wheels to two wheels, in order to reduce the space occupied by it, the operator grasps the handle and tilts the main frame forwardly into a position approaching the vertical as shown in Fig. 2. This, of course, lifts the rear wheels clear of the ground, and the operator then applies pressure with his foot to the lower end of the auxiliary frame adjacent to the rear wheels and thus swings such frame forwardly on its pivots 8 into a folded position adjacent or against the main frame as shown in Fig. 2. In this position the rear wheels of course are elevated a substantial distance above the front wheels, and the vehicle, supported on the front wheels only, may be manipulated by the handle which remains in its upright operative position.

It will further be noted that the link means 16, 18 is reversible and that it occupies a different position in Fig. 2 from that which it occupies in Fig. 1. That is to say, as the auxiliary frame 7 swings on its pivot, the link 16 turns on its pivot 15 and swings from the position shown in Fig. 1 to that shown in Fig. 2. During this movement the pivot 20 swings across the center line joining the pivots 8 and 15. Thus during the movement of the auxiliary frame, the seat frame 11 is swung upwardly until the pivot 20 crosses the above mentioned center line, whereupon it drops slightly downwardly again into the position shown in Fig. 2. When in this position it will be seen that the weight of the child in the seat, acting through the link means, serves to maintain the parts in the position shown, with the auxiliary frame folded against the main frame, and with the vehicle converted from four wheels to two wheels. And it will be noted that during this conversion the child occupying the seat was not disturbed, and that the seat is maintained in a substantially horizontal position.

Figure 3:
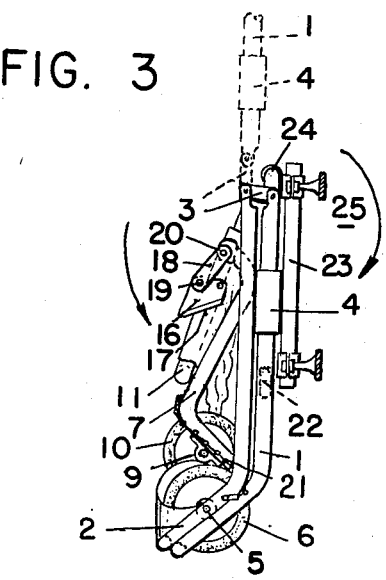
Fig. 3 is a similar view showing the vehicle completely collapsed for purposes of storage or transportation, parts being illustrated in dotted lines.

When it is desired to completely fold or collapse the vehicle for storage or transportation purposes, the sleeves 4 are slipped longitudinally and the upper section 1 of the main frame folded down into a position parallel with the section 2, as shown in Fig. 3. At the same time, by "breaking" the rule joint between the links 16 and 18, by swinging the pivot 19 upwardly as viewed in Fig. 2, the seat frame 11 may be swung downwardly into collapsed position as shown in Figs. 3 and 6.

My improved stroller is preferably provided with an adjustable sunshade or canopy 24. This is carried by an arm 23 supported on a cross bar 22 extending between the side members of the handle section 1 of the frame.

For securing the arm 23 to both the bar 22 and the canopy 24 I employ a special clamping device designated in its entirety by the reference number 25, and shown in detail in Fig. 7. This clamp comprises a pair of split sleeves 26 having projecting flanges through which passes a single bolt 27 having at its end a handwheel 28, and provided with a nut 29. These split sleeves are further formed with mating portions 30 having flat faces lying in close contact as indicated at 31.

From the foregoing it will be clear that when the bolt 27 is loosened relative longitudinal movement may take place between the split sleeves and the bar 22 and arm 23, and also that the flat surfaces and the mating portions 30 may freely turn relative to each other. Thus the distance between the canopy 24 and the supporting bar 22 may be varied as desired, and the arm 23 may be set at any desired angle to both the supporting bar and canopy. When the bolt 27 is tightened the parts are clamped in adjusted position. In other words it will be seen that the improved device 25 provides for universal movement or adjustment at each end of the arm 23.

In Figs. 1 and 4 the canopy is shown as extended to its extreme forward position. In Fig. 2 it is shown as folded back into a position beneath and substantially parallel with the arm 23, while in Fig. 5 it is shown in folded position in which it lies between the two legs of the handle section 1 and substantially in the plane thereof. Fig. 3 shows the position of the arm 23 and canopy 24 when the device is in fully folded position.

In Figs. 8 to 12 I have shown a somewhat modified construction of stroller embodying the same broad principles.

In this modification the auxiliary frame 7' carrying the rear wheels, is pivoted at 8' to a bracket 32 rigidly secured to the section 2 of the frame. A similar bracket 34 is rigidly secured to the seat frame 11 at a point remote from the pivot 12, and pivoted to the bracket 34 at 33 is a toggle link assembly comprising the members 35 and 38 pivoted together at 37, the other end of the link 38 being pivoted to the auxiliary frame 7' at 39.

As in the preceding figures this toggle link assembly is constructed with a "rule" joint, this being accomplished by forming the link 35 with a marginal flange 36 which bears against the link 38. It will be noted that, when in the position shown in Figs. 8 and 9, the pivot 37 of the toggle links lies above the line joining the pivots 33 and 39, this being made possible by reason of the downwardly flared end 36ª of the flange 36. Thus in effect the members 35 and 38 constitute a rigid link connecting the pivots 33 and 39.

Figure 8:
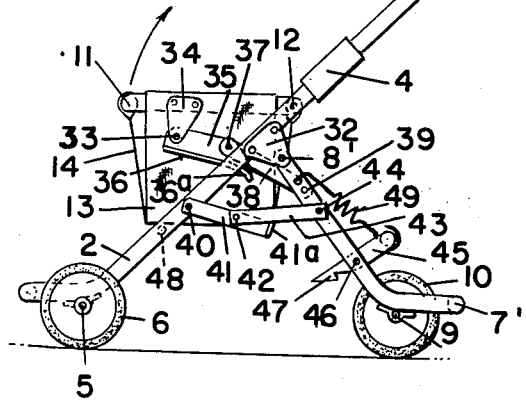
Fig. 8 is a side elevation of a modified construction of a vehicle, the parts being shown in their normal position in which the vehicle is supported on both front and rear wheels.

The auxiliary frame is maintained in the normal position shown in Fig. 8 by a second pair of links 41, 43, pivoted together at 42. The link 41 is pivoted to the main frame section 2 at 40, while the link 43 is pivoted to the auxiliary frame 7' at 44. The end of the link 41 extends a substantial distance beyond the pivot 42 and has an outwardly turned end 41ª which engages the link 43 and acts as a stop to prevent the link structure from assuming a locked position.

In order to hold the auxiliary frame 7' in folded position when the vehicle is converted from four wheels to two wheels I provide a U-shaped latch member 45 pivoted at 46 to the auxiliary frame and having at its forward ends hooks 47 adapted to engage over pins 48 carried by the main frame. A spring 49 attached at one end to the latch member 45 and at the other end to the auxiliary frame at 50 serves to cause the latch member to automatically engage the pins when the auxiliary frame is swung forward.

Figure 9:
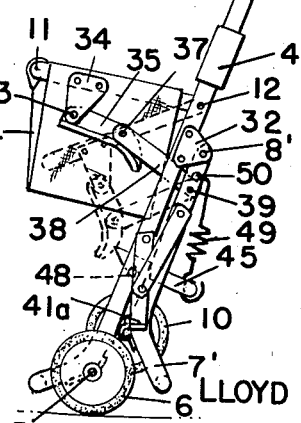
Fig. 9 is a similar view showing the vehicle converted and supported on two wheels only.

The general operation is substantially the same as previously described. The seat frame 11 normally extends at an acute angle to the main frame, which is disposed diagonally when all four wheels are used, as shown in Fig. 8. When it is desired to convert the vehicle to two wheels, the main frame is tilted forward as indicated by the arrow and the operator then exerts pressure with his foot on the auxiliary frame so as to force it forwardly against the main frame as shown in Fig. 9, with the rear wheels 10 elevated above the front wheels. When this occurs the hooks 47 snap over the pins 48 and thus hold the auxiliary frame in folded position.

It will also be observed that as the auxiliary frame is swung forwardly, the link assembly 35, 38 serves to swing the seat frame 11 upwardly on its pivot 12 into a position at substantial right angles to the main frame as shown in Fig. 9. As in the preceding figures it will be noted that after the auxiliary frame is folded as shown in Fig. 9 the seat frame still remains in substantially horizontal position.

Figure 11:
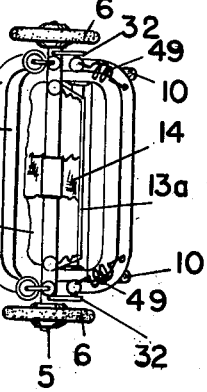
Fig. 11 is a side elevation showing the vehicle completely folded or collapsed for storage or transportation purposes, parts being omitted for the sake of clearness.
Figure 12:
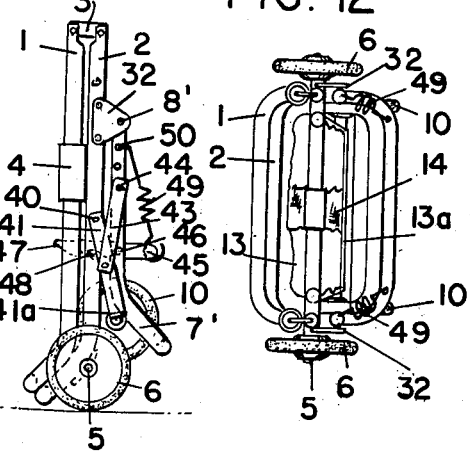
Fig. 12 is a plan view of the vehicle in folded form as shown in Fig. 11.
Figure 10:
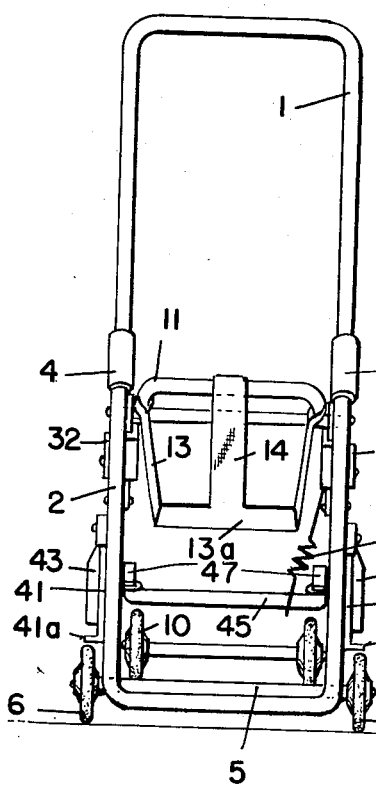
Fig. 10 is a front elevation of the vehicle as shown in Fig. 8.

When it is desired to completely fold or collapse the device for transportation or storage, the locking sleeves 4 are moved longitudinally, and the section 1 folded forwardly and downwardly into the position as shown in Fig. 11. By breaking the rule joint at the pivot 37, as shown in dotted lines in Fig. 9, the seat frame 11 may be swung downwardly into a position substantially in the plane of the main frame. In Fig. 11 the seat frame and seat are supposed to have been thus swung into collapsed position, but have been omitted from the drawing for the sake of clearness. The seat frame would be substantially concealed behind the main frame, in this figure, in any event.

While I have shown and described the auxiliary frame as carrying a pair of rear wheels, it is obvious that only a single rear wheel may be employed if desired, thus providing a three wheel support for the stroller when in normal position. Whether three or four wheels are used, it is obvious when in normal position a polygonal wheel base is provided for supporting the vehicle.

Figure 13:
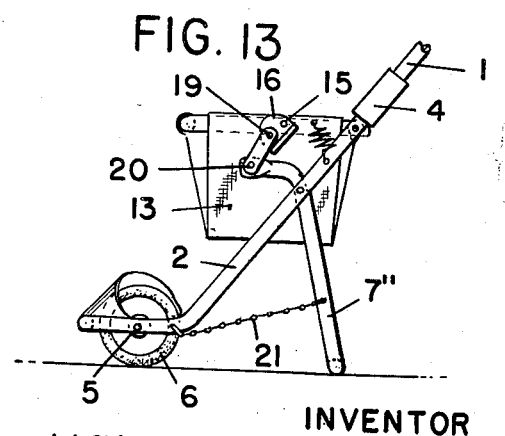
Fig. 13 is a fragmentary view, similar to Fig. 1, but showing a further slightly modified construction.

Furthermore, the rear wheel or wheels may, if desired, be omitted entirely, the auxiliary frame being constructed to engage the ground directly, as shown at 7" in Fig. 13; and constituting merely a prop.

Also, while I have shown and described the vehicle as provided with a seat for the accommodation of a child, it will be obvious that many of the novel features of construction are equally applicable to a utility or shopping cart, in which a basket or other form of load carrier takes the place of the seat. Therefore, it will be understood that, in the appended claims, wherever applicable, by the term "seat" I intend to include any other load supporting receptacle.

What I claim is:

1. A hand propelled vehicle comprising a main frame, a pair of front wheels carried by said main frame, an auxiliary frame pivotally connected with said main frame, a rigid seat frame pivotally mounted at one end on said main frame, link means connecting said auxiliary frame with a point on said rigid seat frame remote from its pivot, whereby movement of said auxiliary frame on its pivot serves to swing said seat frame on its said pivot relative to said main frame, said link means comprising a pair of toggle links united by a rule joint, and rear wheel means carried by said auxiliary frame.

2. A hand propelled vehicle comprising pivotally connected main and auxiliary frames, front wheels carried adjacent one end of said main frame, rear wheel means carried adjacent one end of said auxiliary frame, said main frame being normally disposed diagonally, a seat frame pivoted at one end to said main frame and normally disposed at an acute angle thereto, means whereby, when said main frame is shifted toward a vertical position, said auxiliary frame with said rear wheel means, may be folded against it, and means whereby such folding operation serves to swing said seat frame on its pivot into a position at substantial right angles to said main frame, so that, when said main frame approaches a vertical position, said seat frame occupies a substantially horizontal, operative position.

3. A hand propelled vehicle comprising pivotally connected main and auxiliary frames, front wheels carried adjacent one end of said main frame, rear wheel means carried adjacent one end of said auxiliary frame, a rigid seat frame pivoted at one end to said main frame, and disposed at an angle thereto, said auxiliary frame, with the rear wheel means, being foldable forwardly about its pivot against said main frame, in such manner as to bring said rear wheel means into a position adjacent said front wheels, link means connecting said auxiliary frame with said rigid seat frame at a point intermediate its ends and disposed below said seat frame, said link means being so constructed and arranged that when said auxiliary frame is thus folded, said entire, rigid seat frame is swung on its pivot into a different operative angular position relative to said main frame, and means for holding said auxiliary frame in such folded position and said seat frame in said different operative position.

4. A hand propelled vehicle comprising a main frame, a pair of front wheels carried by said main frame, an auxiliary frame pivotally connected with said main frame, a rigid seat frame pivotally mounted at one end on said main frame, toggle links connecting said auxiliary frame with a point on said rigid seat frame spaced a substantial distance from its pivot, said toggle links having a normally rigid rule joint, means including said toggle links whereby movement of said auxiliary frame on its pivot serves to swing said seat frame upwardly on its said pivot relative to said main frame, and whereby, when said rule joint is broken, said seat frame may swing downwardly on its pivot into collapsed position for storage, and rear wheel means carried by said auxiliary frame.

5. A hand propelled vehicle comprising main and auxiliary frames, pivotally connected and normally crossing each other, a pair of front wheels carried by said main frame, and rear wheel means carried by said auxiliary frame, a rigid seat frame pivoted at one end to said main frame, and reversible toggle links connecting the upper end of said auxiliary frame with a point on said rigid seat frame remote from its pivot, said toggle links comprising one member pivoted to said seat frame and another member pivoted, to said first member and said auxiliary frame, said links having a normally rigid rule joint, whereby, when the lower end of said auxiliary frame is moved on its pivot toward said main frame into folded position said seat frame is swung on its pivot first upwardly and then slightly downwardly as said toggle links swing across a center line from one angular position to another, and whereby, when said rule joint is broken when said links are in said second angular position, said seat frame may be swung downwardly into collapsed position for storage.

6. A hand propelled vehicle having a main frame comprising a pair of parallel members constituting a handle, a rigid seat frame pivoted at its rear end to said main frame and projecting forwardly therefrom in a substantially horizontal position, a pair of front wheels carried by said main frame below said seat frame, a rearwardly extending U-shaped auxiliary frame carrying rear wheel means and a cross-bar at its lower end and having its legs pivoted adjacent their upper end to said parallel members of said main frame, linkage means connecting said auxiliary and seat frames, the arrangement being such that, by grasping the handle and tilting said main frame forwardly so as to lift said rear wheel means from the ground, the operator may, by pressure of his foot on said cross-bar, swing it forwardly on its pivots into a folded position against said main frame, and means including said linkage for maintaining said seat frame in a substantially horizontal, operative position when said auxiliary frame is thus folded.

7. A hand propelled vehicle comprising a main frame, a pair of wheels carried by said main frame, an auxiliary frame pivotally connected with said main frame, and normally cooperating with said wheels to support the vehicle, a rigid, U-shaped load carrying frame pivotally mounted at its ends on said main frame, and link means comprising a pair of pivotally united elements connecting said auxiliary frame with an intermediate point of said load-carrying frame and constituting the sole means for maintaining the latter in operative position.

8. A hand propelled vehicle comprising a main frame including a pair of spaced, parallel members united at their upper end by a cross-bar, thus constituting a handle, a pair of front wheels carried at the lower end of said main frame, an auxiliary, rearwardly projecting frame pivotally connected with said main frame and carrying at its lower end rear wheel means, a seat frame pivotally mounted at its rear end on said main frame, and link means connecting said auxiliary frame with said seat frame at a point intermediate its length to support the same, said auxiliary frame being foldable forwardly against said main frame so as to carry said rear wheel means up out of contact with the ground while said handle is maintained in operative position for propelling the vehicle, and said link means being so constructed that said auxiliary frame may be thus folded without disturbing the occupant of the seat, whereby said vehicle may be converted during operation to a structure supported on the pair of front wheels only.

LLOYD H. LEONARD.

References Cited in the file of this patent

UNITED STATES PATENTS

| Number | Name | Date |
| --- | --- | --- |
| 230,312 | McKee | July 20, 1880 |
| 236,027 | Hazelip | Dec. 28, 1880 |
| 782,295 | Weber | Feb. 14, 1905 |
| 867,465 | Bacon | Oct. 1, 1907 |
| 879,907 | Riffo | Feb. 25, 1908 |
| 1,718,851 | Brown | June 25, 1929 |
| 1,764,914 | Vande Mark | June 17, 1930 |
| 2,013,910 | Burst | Sept. 10, 1935 |
| 2,054,967 | Dahl | Sept. 22, 1936 |
| 2,134,855 | Bucher | Nov. 1, 1938 |
| 2,438,829 | Skolnik | Mar. 30, 1948 |
| 2,455,119 | Hall | Nov. 30, 1948 |
| 2,471,004 | Moster | May 24, 1949 |
| 2,506,601 | Kelch | May 9, 1950 |